US008334869B1

(12) United States Patent
Padmakar et al.

(10) Patent No.: US 8,334,869 B1
(45) Date of Patent: Dec. 18, 2012

(54) METHOD AND APPARATUS FOR MODELING 3-D SHAPES FROM A USER DRAWN CURVE

(75) Inventors: Avinash Kumar Rao Padmakar, Bangalore (IN); Muthukur Prakash GopalaKrishna Sharma, Bangalore (IN); Jaideep Jeyakar, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 891 days.

(21) Appl. No.: 12/409,284

(22) Filed: Mar. 23, 2009

(51) Int. Cl.
*G06T 17/00* (2006.01)
(52) U.S. Cl. ........................................ 345/420
(58) Field of Classification Search .................. None
See application file for complete search history.

(56) References Cited

U.S. PATENT DOCUMENTS

| 5,805,858 | A  | * | 9/1998 | Kumamoto et al. ............... 703/1 |
| 6,549,201 | B1 | * | 4/2003 | Igarashi et al. ............... 345/423 |
| 2007/0211065 | A1 | * | 9/2007 | Feth et al. ...................... 345/522 |
| 2008/0036771 | A1 |   | 2/2008 | Bae |
| 2008/0036773 | A1 | * | 2/2008 | Bae .............................. 345/442 |

OTHER PUBLICATIONS

Demetri Terzopoulos, "Symmetry-Seeking Models and 3D Object Reconstruction", 1987, Kluwer Academic Publishers,International Journal of Computer Vision, 1, pp. 211-221.*
Demetri Terzopoulos, "Symmetry-Seeking Models and 3D Object Reconstruction", 1987, Kluwer Academic Publishers, International Journal of Comper Vision 1, pp. 211-221.*
"SGI OpenGL Multiple SDK User's Guide," version 3.2, Chapter 3, Frustum Descriptions. (2005).
Mario Costa Sousa and John W. Buchanan, "Computer-Generated Graphite Pencil Rendering of 3D Polygonal Models," Eurographics '99 vol. 18 (1999), No. 3.
Takeo Igarashi, Satoshi Matsuoka, Hidehiko Tanaka, Teddy, "A Sketching Interface for 3D Freeform Design," ACM SIGGRAPH 99, Aug. 1999.
Takeo Igarashi, Satoshi Matsuoka, Hidehiko Tanaka, Teddy, "A Sketching Interface for 3D Freeform Design," ACM SIGGRAPH 99, Aug. 1999, Slide Presentation.

* cited by examiner

*Primary Examiner* — Said Broome
*Assistant Examiner* — Janice Kau
(74) *Attorney, Agent, or Firm* — Robert C. Kowert; Meyertons, Hood, Kivlin, Kowert & Goetzel, P.C.

(57) ABSTRACT

Method and apparatus for modeling 3-D frustums using a single click-and-draw action. A cursor control device button is pressed at a desired starting point. The user then moves the cursor to draw a curve. When the curve intersects, the shape that has been drawn is saved as a start surface. When the cursor control device button is released, the method may search for one or more other intersections from the end of the curve. If another intersection is found, the intersection defines an end surface. If one or more additional intersections are found, the additional intersections may be used to define intermediate surfaces. The recorded points between the start and end surfaces define the path of the frustum. If a second intersection is not found, the start surface may be duplicated as the end surface. Once the user completes the curve, the frustum defined by the curve may be rendered.

25 Claims, 8 Drawing Sheets

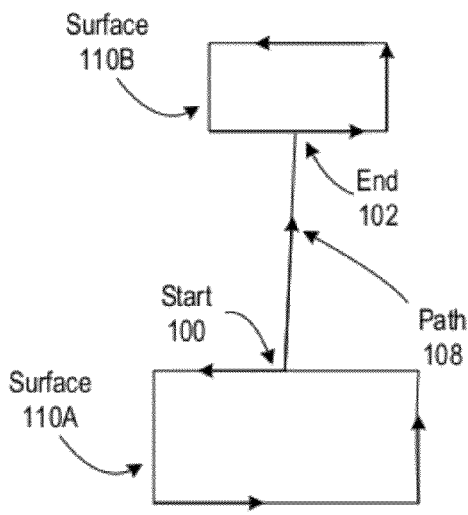
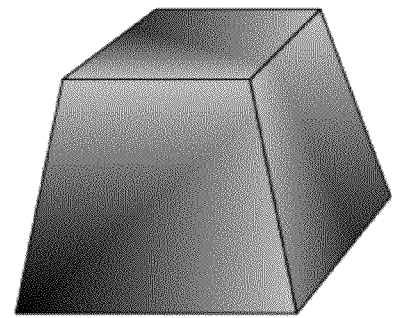
Figure 5A
Figure 5B
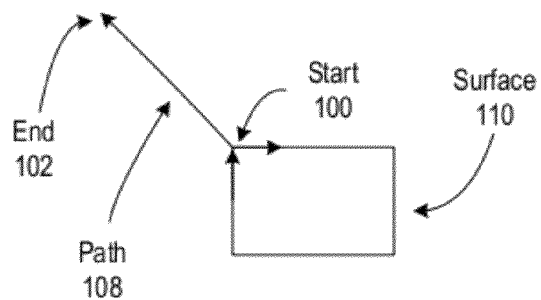
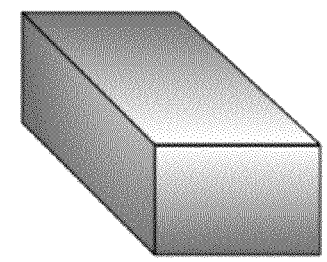
Figure 6A
Figure 6B
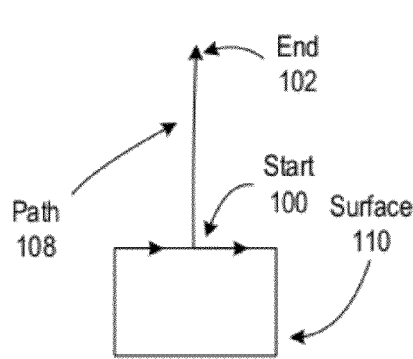
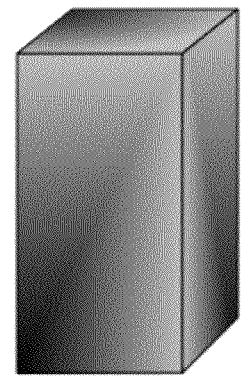
Figure 7A
Figure 7B

METHOD AND APPARATUS FOR MODELING 3-D SHAPES FROM A USER DRAWN CURVE

BACKGROUND

Description of the Related Art

A frustum is one of the basic 3D primitive shapes. To create a 3D frustum using conventional 3-D modeling tools, a user needs some expertise in or knowledge of the 3-D coordinate system. This makes the process difficult for new users. Even experienced users need to perform several operations to create a frustum.

There are several conventional techniques for creating frustums. Each of these conventional techniques involves several steps, and all of these techniques require multiple mouse clicks or other user actions. One conventional technique is to create a frustum from its vertex point list. This is a programmatic method of creating a frustum, and requires some programming skills and knowledge of the 3D coordinate system. Another conventional technique is to create a frustum using a profile curve and extrusion. In this technique, the user must draw a 2-D profile curve/surface, and then extrude the curve to get a 3-D mesh. Yet another conventional technique is referred to as lofting, which may be used if the start and end surfaces of the desired frustum are not identical. In this technique, the user draws two or more 2-D curves/surfaces, and then draws a path to specify the shape. The user then selects the curves and path, and lofts the selection.

The following describes several steps that may be involved in creating a 3-D frustum using conventional 3D modeling tools. First, the user draws the cross section of the frustum as a series of curves; the start and end of the frustum are part of the created curves. The user then arranges the curves in the desired order and defines the path to form the skeleton of the frustum. The user then selects each of the curves in the order in which the frustum has to be created. The user then goes to a user interface element, for example a menu, to select a loft tool to loft the skeleton to generate the desired surface. Thus, using conventional techniques requires several steps to generate a frustum; in this example, a minimum of four steps is required to create a frustum.

SUMMARY

Various embodiments of a method and apparatus for modeling 3-D shapes, or frustums, are described. Embodiments provide a method for modeling 3-D frustums on a computer screen using a single click-and-draw cursor control device (e.g., a mouse, a tablet and stylus, a touchpad, a touch screen, etc.) gesture. Embodiments may provide a tool that implements the frustum modeling method, referred to as a frustum modeling tool, that may be employed by users to create 3D frustums (and to define some of their properties) using a single click-and-draw gesture. Embodiments of the frustum modeling tool thus provide a single click-and-draw action method for generating simple, complex or irregular frustums that is simpler than conventional techniques, and that reduces the user interaction required to generate frustums when compared to conventional techniques.

Embodiments of the frustum modeling tool may be implemented in or by a frustum modeling module. The frustum modeling module may present a user interface on a computer screen or screens that includes at least a drawing area, and may also include one or more user interface elements that allow the user to set or select one or more drawing options and/or tools. In embodiments, when the cursor control device button is pressed by the user at a desired starting location or point, the frustum modeling module begins recording the cursor location. The user then moves the cursor via the cursor control device, with the frustum modeling module recording at least some of the locations or points that the cursor is moved to or over. When the drawn curve intersects itself, the frustum modeling module saves the shape that has been drawn as a start surface. The frustum modeling module continues to record points until the cursor control device button is released. The frustum modeling module may then search for one or more other intersections from the end of the user-drawn figure (the point where the cursor control device button is released). If another intersection is found, the recorded points in between define an end surface. If one or more additional intersections are found, the additional intersections may be used to define intermediate surfaces between the start and end surfaces. The recorded points between the start and end surfaces define the path of the frustum. If a second intersection is not found, that is if there is only one intersection and thus only a start surface defined by the user's drawing action, then the start surface may be duplicated as the end surface. In some embodiments, if there are two or more intersections and the user-drawn curve finishes off with a straight line that extends beyond the second intersection, then the last line or "tail" may be used to specify the direction of orientation of the 3-D model or frustum. In some embodiments, the tail may be used to specify other information such as color, position, and/or velocity.

Once the user completes the drawing by releasing the cursor control device button, and the frustum modeling module performs any necessary analysis to interpret the user's input, the frustum modeling module may then render the geometric shape (model) defined by the user's input. Any of various conventional surface-rendering algorithms or techniques may be used to render the model from the input. Once rendered, the model may then be edited or manipulated using conventional modeling tools, and may be stored, for example in a file on a storage device, as a 3-D object and/or as part of a 3-D image.

Some embodiments may provide different modes of orientation for defining the frustum. In a parallel path orientation mode, the path drawn by the user is taken as on, or parallel to, the plane of the screen. In an oblique path orientation mode, the path is taken as not on or parallel to the plane of the screen. In oblique mode, the path may lie on a vector perpendicular to the plane of the screen or on any other vector that intersects but is not parallel to the plane of the screen. Embodiments of the user interface to the frustum modeling module may provide one or more user interface elements that allow a user to select the desired orientation mode that will be used when rendering a frustum from a user-input curve Embodiments of the frustum modeling module may be implemented or used in various applications including but not limited to 3-D modeling application to generate frustums or other geometric shapes using a single click-and-draw action. An example of an application in which embodiments may be implemented is Adobe® Director®.

While embodiments are generally described for generating frustums, the technique may be extended to generate other 3-D primitives (e.g. cones, helix, etc.).

BRIEF DESCRIPTION OF THE DRAWINGS

FIGS. 5A and 5B illustrate another example curve that may be drawn by a user using the frustum modeling tool and an example frustum model rendered therefrom by an embodiment of the frustum modeling module.

FIGS. 6A and 6B illustrate another example curve that may be drawn by a user using the frustum modeling tool and an example frustum model rendered therefrom by an embodiment of the frustum modeling module.

FIGS. 7A and 7B illustrate another example curve that may be drawn by a user using the frustum modeling tool and an example frustum model rendered therefrom by an embodiment of the frustum modeling module.

Figure 1:
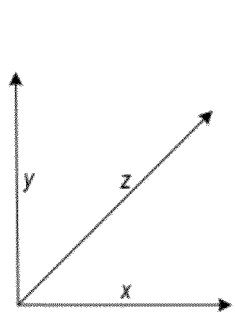
FIG. 1 illustrates a coordinate system that may be used in embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for modeling 3-D shapes, or frustums, are described. Embodiments provide a method for modeling 3-D frustums on a computer screen using a single click-and-draw cursor control device (e.g., mouse) gesture. Embodiments may provide a tool that implements the frustum modeling method, referred to as a frustum modeling tool, that may be employed by users to create 3D frustums (and to define some of their properties) using a single click-and-draw gesture. To create a frustum with the frustum modeling tool, the user first describes one of the surfaces (i.e., the first or start surface), then proceeds to describe depth information, and finishes by describing another surface (i.e., the last or end surface). Embodiments of the frustum modeling tool thus provide a method for generating frustums that is simpler than conventional techniques, and that reduces the user interaction required to generate frustums when compared to conventional techniques. Using embodiments, a user may generate simple or complex frustums or other geometric shapes using a single click-and-draw action. Using conventional techniques, the user would have to perform several operations to create even a simple frustum. Embodiments of the frustum modeling tool may be used to generate frustums that do not have straight paths with the single click-and-draw action; using conventional techniques, the user would have to separately define the path.

A frustum is a basic 3D primitive shape. In geometry, a frustum may be defined as a "slice" taken out of a solid figure by a pair of parallel planes. For example, cubes, cuboids, trapezoids, cylinders, pipes, and truncated pyramids are all frustums. Frustums, as used herein, may also include more complex, arbitrary shapes; see, for example, FIG. 8B. The two end surfaces of a frustum may be referred to as the start and end surfaces, with the start surface corresponding to the first surface drawn by the user, and the end surface corresponding to the last surface drawn by the user. The path of a frustum may be defined as the path followed by the center of any section of the frustum taken parallel to its start and end surfaces.

Embodiments of the frustum modeling tool may be implemented in or by a frustum modeling module. The frustum modeling module may present a user interface on a computer screen or screens that includes at least a drawing area, and may also include one or more user interface elements that allow the user to set or select one or more drawing options and/or tools. In embodiments, when the cursor control device button is pressed by the user at a desired starting location or point, the frustum modeling module begins recording the cursor location. The user then moves the cursor via the cursor control device, with the frustum modeling module recording at least some of the locations or points that the cursor is moved to or over. When the drawn curve intersects itself, the frustum modeling module saves the shape that has been drawn as a start surface. The frustum modeling module continues to record points until the cursor control device button is released. The frustum modeling module may then search for one or more other intersections from the end of the user-drawn figure (the point where the cursor control device button is released). If another intersection is found, the recorded points in between define an end surface. If one or more additional intersections are found, the additional intersections may be used to define intermediate surfaces between the start and end surfaces. The recorded points between the start and end surfaces define the path of the frustum. If a second intersection is not found, that is if there is only one intersection and thus only a start surface defined by the user's drawing action, then the start surface may be duplicated as the end surface.

In some embodiments, if there are two or more intersections and the user-drawn curve finishes off with a straight line that extends beyond the second intersection, then the last line or "tail" may be used to specify the direction of orientation of the 3-D model or frustum. In some embodiments, the tail may be used to specify other information such as color, position, and/or velocity. With the x and y axes on the plane of the screen and the z axis perpendicular to the plane of the screen (see FIG. 1), the start and end surfaces may be rendered in the x-y plane (the plane of the screen). The path may be taken in the x-z or y-z plane.

Once the user completes the drawing by releasing the cursor control device button, and the frustum modeling module performs any necessary analysis to interpret the user's input, the frustum modeling module may then render the geometric shape (model) defined by the user's input. Any of various conventional surface-rendering algorithms or techniques may be used to render the model from the input. Once rendered, the model may then be edited or manipulated using conventional modeling tools, and may be stored, for example in a file on a storage device, as a 3-D object and/or as part of a 3-D image.

Some embodiments may provide different modes of orientation for defining the frustum. In one mode, the path drawn by the user (that is, the path between intersections or surfaces) is taken as on, or parallel to, the x-y plane, i.e. the plane of the screen. This may be referred to herein as parallel path orientation. In some embodiments, using parallel path orientation, the start and end surfaces are rendered in the x-z plane. See, for example, FIGS. 2A-2B and 3A-3B. In another mode, the path is taken as not on or parallel to the x-y, or screen, plane, i.e. with a z component to the vector that defines the path. This may be referred to herein as oblique path orientation. In some embodiments, using oblique path orientation, the start and end surfaces are rendered in the x-y plane. See, for example, FIGS. 4A-4B. Embodiments of the user interface to the frustum modeling module may provide one or more user interface elements that allow a user to select the desired orientation mode that will be used when rendering a frustum from a user-input curve. Note that some embodiments may allow surfaces to be rendered in the y-z plane, or on other planes that include x, y and z components.

Figure 11:
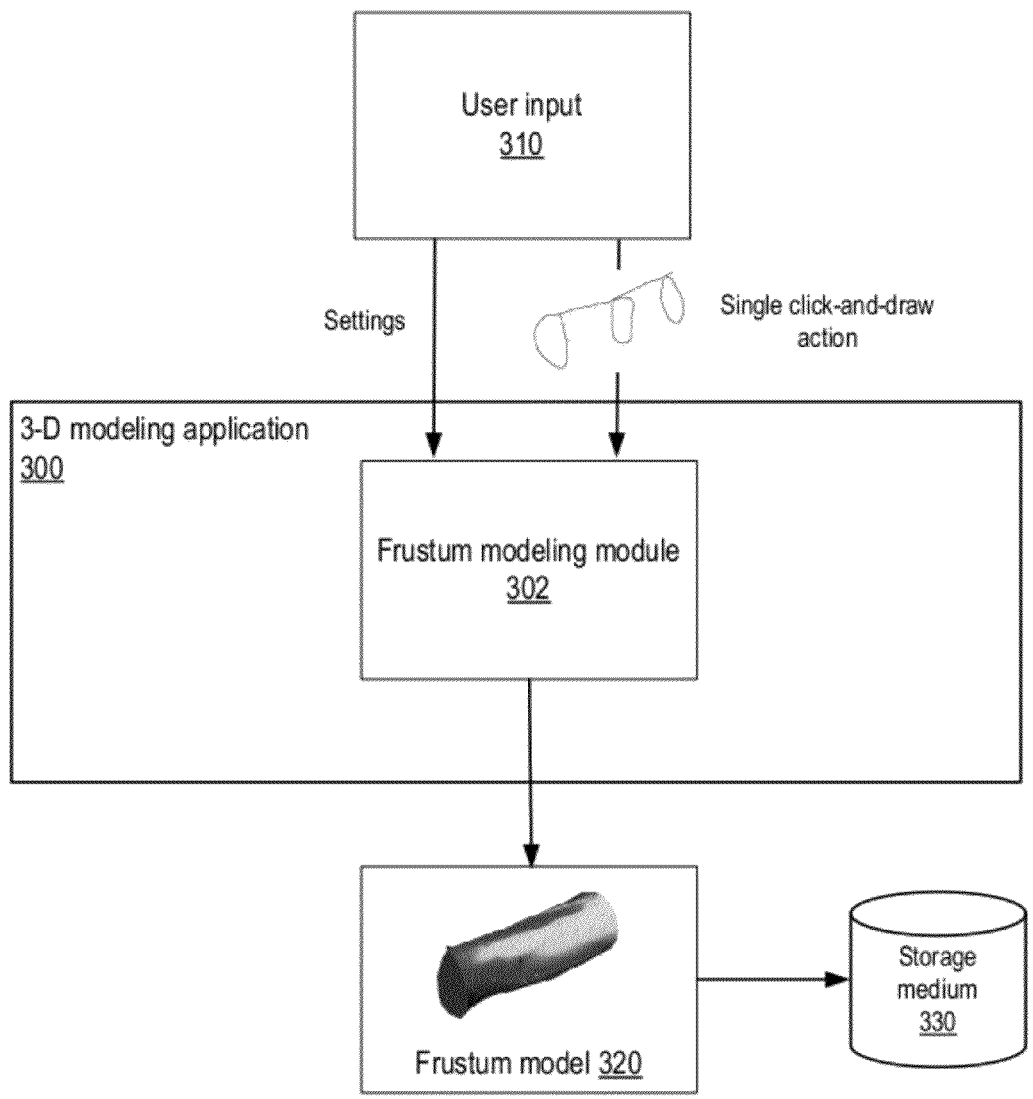
FIG. 11 illustrates an example embodiment of a frustum modeling module.

Some embodiments of the frustum modeling module may be implemented, for example as a stand-alone program or utility, as a library function, or as a module in an application. Some embodiments of the frustum modeling module may be otherwise implemented, for example as a plug-in for 3-D modeling applications or other applications. Embodiments of the frustum modeling module may be implemented or used in various applications to generate frustums or other geometric shapes using a single click-and-draw action. An example of a 3-D modeling application in which embodiments may be implemented is Adobe® Director®. In such applications, embodiments of the frustum modeling method described herein, implemented by the frustum modeling module, may be provided as a frustum modeling tool that may be selected or activated via a user interface, for example as a tool selection on a tool menu or tool palette. FIG. 11 illustrates an example embodiment of a frustum modeling module. The frustum modeling module may, for example, be executed on a computer device or computer system, an example of which is provided in FIG. 13.

While embodiments are generally described for generating frustums, the technique may be extended to generate other 3-D primitives (e.g. cones, helix, etc.).

FIGS. 2A through 8B illustrate several examples of user input to embodiments of the frustum modeling module using the single click-and-draw action, and examples of frustum models rendered from the received user input, including examples rendered using different orientation modes, according to embodiments. These Figures are given as examples, and are not intended to be limiting.

Figure 2A:
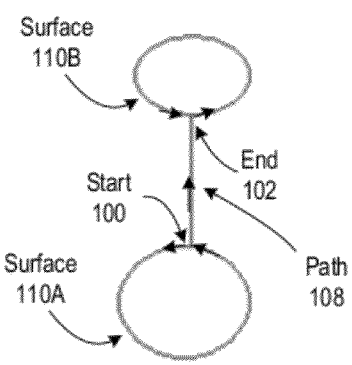
FIGS. 2A and 2B illustrate an example curve that may be drawn by a user using the frustum modeling tool and an example frustum model of a cylinder rendered therefrom by an embodiment of the frustum modeling module.
Figure 2B:
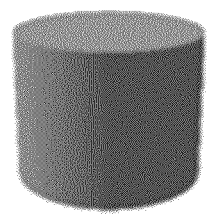

FIGS. 2A and 2B illustrate an example curve that may be drawn by a user using the frustum modeling tool and an example frustum model of a cylinder rendered therefrom by an embodiment of the frustum modeling module. The user draws the curve by, for example, first clicking and holding a button on the cursor control device (e.g., the left button of a computer mouse) at a desired starting point (start 100) on a drawing window or screen indicated by a cursor controlled by the cursor control device, moving the cursor control device to inscribe a first surface (surface 110A), continuing to move the cursor with the cursor control device to draw a desired path 108, moving the cursor control device to inscribe a second surface (surface 110B), and finally releasing the button of the cursor control device at end 102 when surface 110B is completed. A line may be drawn to the screen to indicate the movement of the cursor to thus provide feedback to the user. Once the user completes the drawing by releasing the cursor control device button at end 102, the frustum modeling module performs an analysis to interpret the curve input by the user and then renders the geometric shape (model) defined by the user's input, in this case a cylinder as illustrated in FIG. 2B. In the example shown in FIGS. 2A and 2B, the orientation mode for the path used in rendering the model is parallel path orientation; that is, the path of the frustum is on the x-y plane, i.e. the plane of the drawing screen or a plane parallel thereto, with the ends of the cylinder rendered in the x-z plane.

Figure 3A:
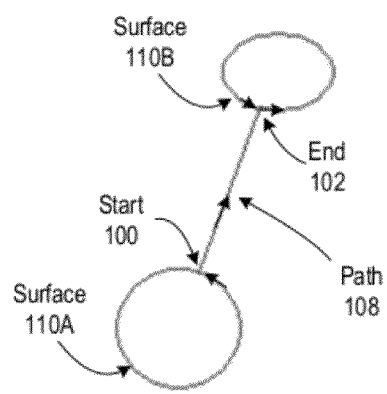
FIGS. 3A and 3B illustrate another example curve that may be drawn by a user using the frustum modeling tool and an example frustum model rendered therefrom by an embodiment of the frustum modeling module.
Figure 3B:
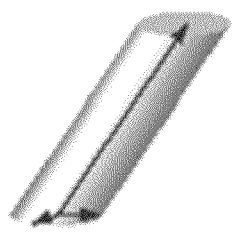

FIGS. 3A and 3B illustrate another example curve that may be drawn by a user using the frustum modeling tool and an example frustum model rendered therefrom by an embodiment of the frustum modeling module. The user draws the curve, for example as described above for FIG. 2A. Once the user completes the drawing by releasing the cursor control device button at end 102, the frustum modeling module performs an analysis to interpret the curve input by the user and then renders the geometric shape (model) defined by the user's input, in this case an angled "pipe" as illustrated in FIG. 3B. In the example shown in FIGS. 3A and 3B, the orientation mode for the path used in rendering the model is again parallel path orientation; that is, the path of the frustum is on the x-y plane, i.e. the plane of the drawing screen or a plane parallel thereto, with the ends of the pipe rendered in the x-z plane.

Figure 4A:
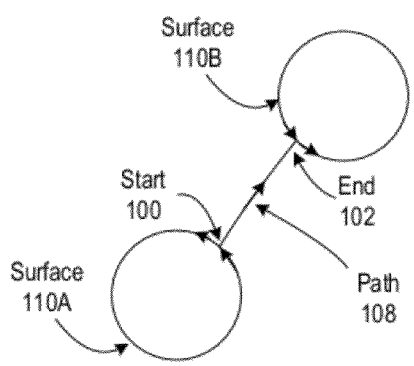
FIGS. 4A and 4B illustrate another example curve that may be drawn by a user using the frustum modeling tool and an example frustum model rendered therefrom by an embodiment of the frustum modeling module.
Figure 4B:
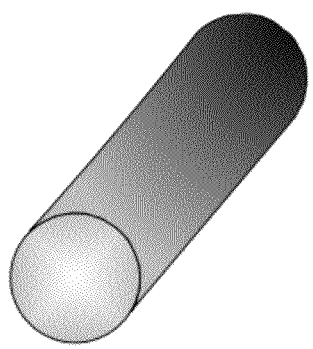

FIGS. 4A and 4B illustrate another example curve that may be drawn by a user using the frustum modeling tool and an example frustum model rendered therefrom by an embodiment of the frustum modeling module. The user draws the curve, for example as described above for FIG. 2A. Once the user completes the drawing by releasing the cursor control device button at end 102, the frustum modeling module performs an analysis to interpret the curve input by the user and then renders the geometric shape (model) defined by the user's input, in this case an oblique "pipe" as illustrated in FIG. 4B. In the example shown in FIGS. 4A and 4B, the orientation mode for the path used in rendering the model is oblique path orientation; that is, the path of the frustum lies on a vector that intersects but is not parallel to the x-y plane, with the ends of the pipe rendered in the x-y plane.

FIGS. 5A and 5B illustrate another example curve that may be drawn by a user using the frustum modeling tool and an example frustum model rendered therefrom by an embodiment of the frustum modeling module. The user draws the curve, for example as described above for FIG. 2A. Once the user completes the drawing by releasing the cursor control device button at end 102, the frustum modeling module performs an analysis to interpret the curve input by the user and then renders the geometric shape (model) defined by the user's input, in this case a truncated pyramid as illustrated in FIG. 5B. In the example shown in FIGS. 5A and 5B, the orientation mode for the path used in rendering the model is again parallel path orientation; that is, the path of the frustum is on the x-y plane, i.e. the plane of the drawing screen or a plane parallel thereto, with the ends of the truncated pyramid rendered in the x-z plane.

FIGS. 6A and 6B illustrate another example curve that may be drawn by a user using the frustum modeling tool and an example frustum model rendered therefrom by an embodiment of the frustum modeling module. The user draws the curve, for example as described above for FIG. 2A. However, in this example, the user releases the cursor control device at end 102 without drawing a second surface 110B. Once the user completes the drawing by releasing the cursor control device button at end 102, the frustum modeling module may duplicate the surface 110A as the second or end surface of the frustum. The frustum modeling module then performs further analysis to interpret the curve and renders the geometric shape (model), in this case an oblique cuboid as illustrated in FIG. 6B. In the example shown in FIGS. 6A and 6B, the orientation mode for the path used in rendering the model is oblique path orientation; that is, the path of the frustum is oblique to the x-y plane, with the ends of the cuboid rendered in the x-y plane.

FIGS. 7A and 7B illustrate another example curve that may be drawn by a user using the frustum modeling tool and an example frustum model rendered therefrom by an embodiment of the frustum modeling module. The user draws the curve, for example as described above for FIG. 2A. However, in this example, as in FIG. 6A, the user releases the cursor control device at end 102 without drawing a second surface 110B. However, unlike the example shown in FIG. 6A, the orientation mode for the path used in rendering the model is parallel path orientation; therefore, the path of the frustum is parallel to the x-y plane, and the ends of the cuboid are rendered in the x-z plane.

Figure 8A:
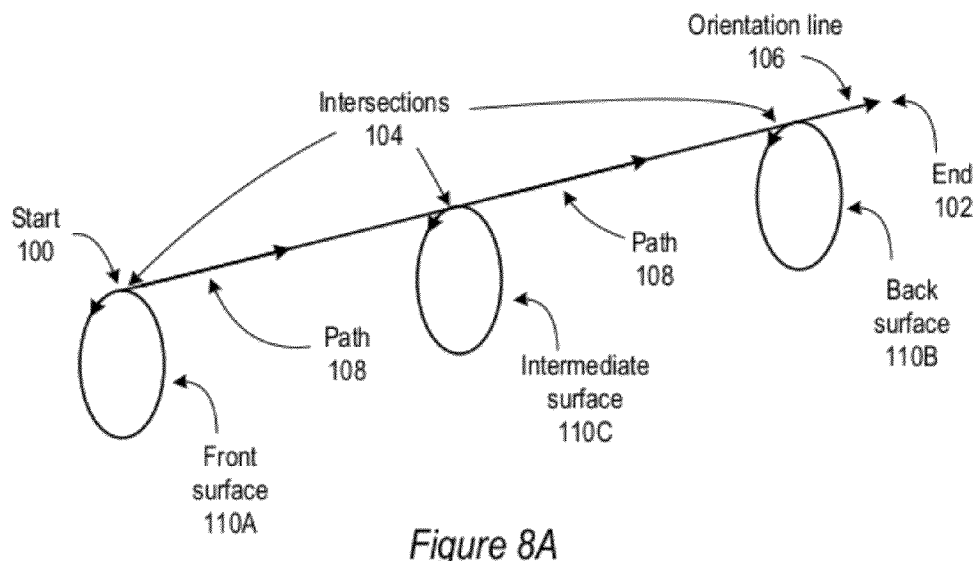
FIGS. 8A and 8B illustrate another example curve that may be drawn by a user using the frustum modeling tool and an example frustum model rendered therefrom by an embodiment of the frustum modeling module.
Figure 8B:
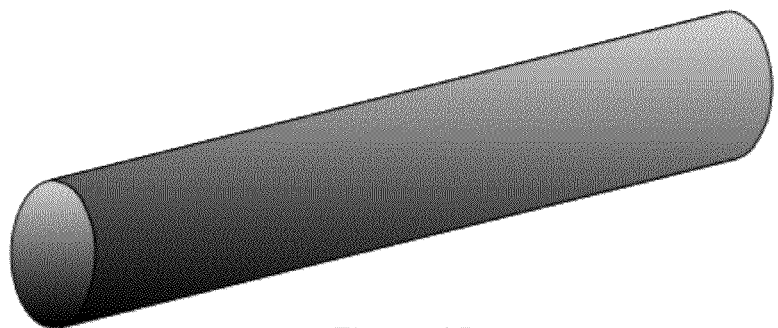

FIGS. 8A and 8B illustrate another example curve that may be drawn by a user using the frustum modeling tool and an example frustum model rendered therefrom by an embodiment of the frustum modeling module. The user draws the curve, for example as described above for FIG. 2A. However, in this example, the user draws an intermediate surface 110C as well as an end surface 110B. The user also extends a "tail" beyond the end surface 110B and releases the cursor control device at the end 102 of the tail. This "tail" may be used to specify the direction of orientation of the frustum during rendering. In some embodiments, the tail may be used to specify other information such as color, position, and/or velocity. Once the user completes the drawing by releasing the cursor control device button at end 102, the frustum modeling module may analyze the user input to interpret the curve. In some embodiments, the frustum modeling module may, starting at the end 102, track backwards to identify intersections 104. Each intersection may be used to identify a corresponding surface 110. One or more intermediate surfaces 110C, when identified, may be used to adjust the shape of the frustum during rendering. In addition, the intermediate paths 108 may be used to adjust the shape of the frustum during rendering. The frustum modeling module then renders the geometric shape (model), in this case an oblique pipe as illustrated in FIG. 8B. In the example shown in FIGS. 8A and 8B, the orientation mode for the path used in rendering the model is oblique path orientation; that is, the path of the frustum is oblique to the x-y plane, while the ends of the pipe may be rendered in the x-y plane. Some embodiments may allow the surfaces to be rendered in the x-z or y-z planes, or on other planes that include x, y and z components.

FIGS. 2A through 8B illustrate "ideal" input by the user. However, user input may not be so clean or ideal. In some embodiments, the frustum modeling module may first clean up the user input, for example by fitting rectangles, squares, or other shapes to the user input indicating surfaces and straightening the paths, before rendering the frustum model. In some embodiments, the cleaned-up curve may be displayed to the screen. In some embodiments, the frustum modeling module may instead take the user input as received and generate a frustum model corresponding to the raw user input. Alternatively, the frustum modeling module may smooth the raw user input to some degree before using the input to generate a frustum, but not go so far as fitting rectangles and straightening paths. Some embodiments may provide one or more user interface elements that allow the user to specify how much, if any, cleaning up of the user input is to be performed, thus allowing the user to choose between having the frustum modeling module clean up the user input by fitting geometric shapes to the input curve, straightening the paths, and so on, before rendering a frustum, and having the frustum modeling module use the input in its raw form, or in smoothed raw form to render a frustum.

Figure 9A:
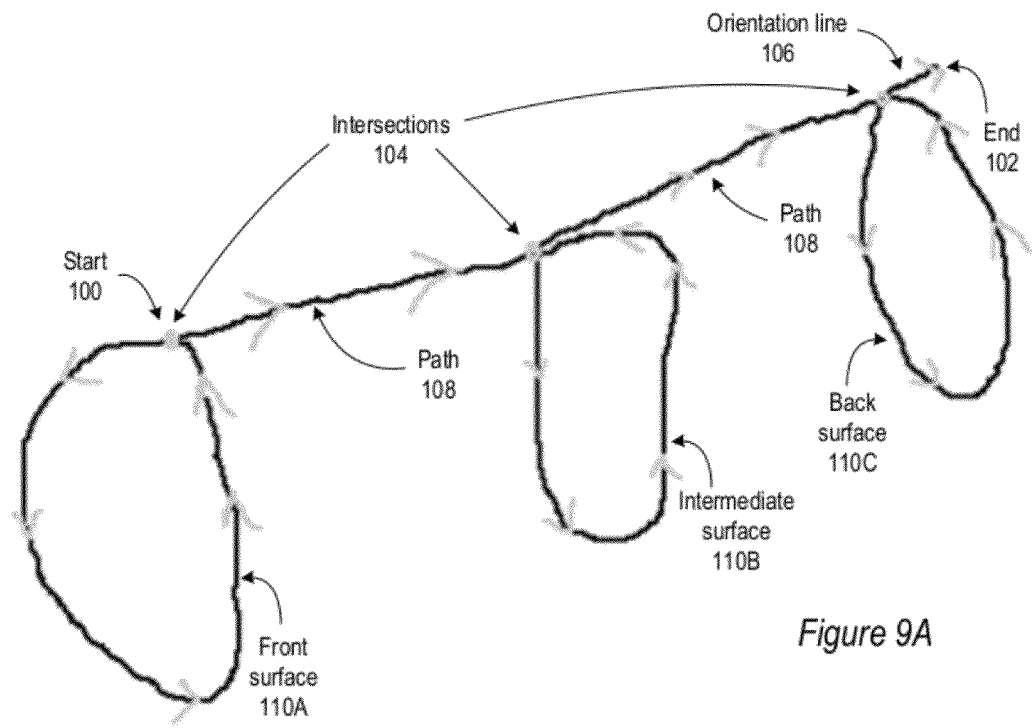
FIGS. 9A and 9B illustrate an example free-form curve that may be drawn by a user using the frustum modeling tool and an example frustum model rendered from the raw input by an embodiment of the frustum modeling module.
Figure 9B:
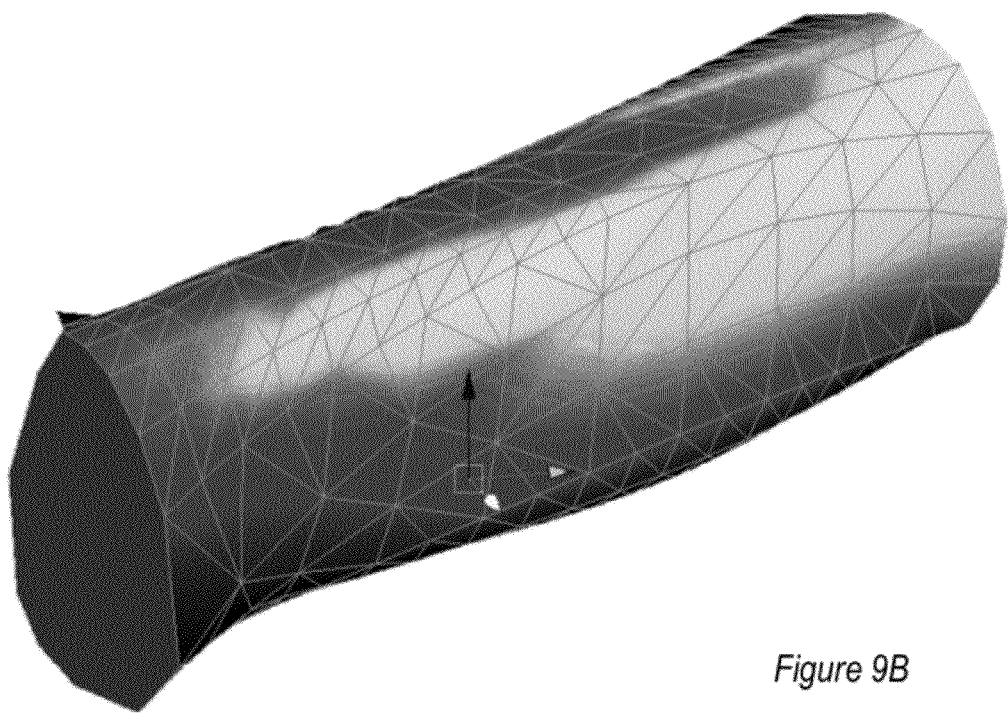

FIGS. 9A and 9B illustrate an example "rough" or freeform curve that may be drawn by a user using the frustum modeling tool and an example frustum model rendered from the raw input by an embodiment of the frustum modeling module. The user draws the curve, for example as described above for FIG. 2A. As in FIG. 8A, the user draws an intermediate surface 110C as well as an end surface 110B, extends a "tail" beyond the end surface 110B, and releases the cursor control device at the end 102 of the tail. The frustum modeling module then processes the user input and renders the geometric shape (model) as described above in relation to FIGS. 8A and 8B to generate a frustum model as illustrated in FIG. 9B. In the example shown in FIGS. 9A and 9B, the orientation mode for the path used in rendering the model is oblique path orientation; that is, the path of the frustum is oblique to the x-y plane, while the ends of the frustum may be rendered in the x-y plane. Some embodiments may allow the surfaces to be rendered in the x-z or y-z planes, or on other planes that include x, y and z components.

Note that the model illustrated in FIG. 9B is an irregular frustum, with its shape defined by the user input (the surfaces and paths). This example shows how embodiments of the frustum modeling tool may be used to easily generate complex and/or irregular frustums, requiring only a single click-and-draw action by the user, with the user input then analyzed and processed to generate the frustum model accordingly.

The interconnected triangles shown on the surface of FIG. 9B illustrate a tessellation pattern that may be generated and used by a surface rendering technique that the frustum modeling module may use in rendering the 3-D frustum model in some embodiments. Any of a variety of surface rendering techniques may be used in embodiments.

Figure 10:
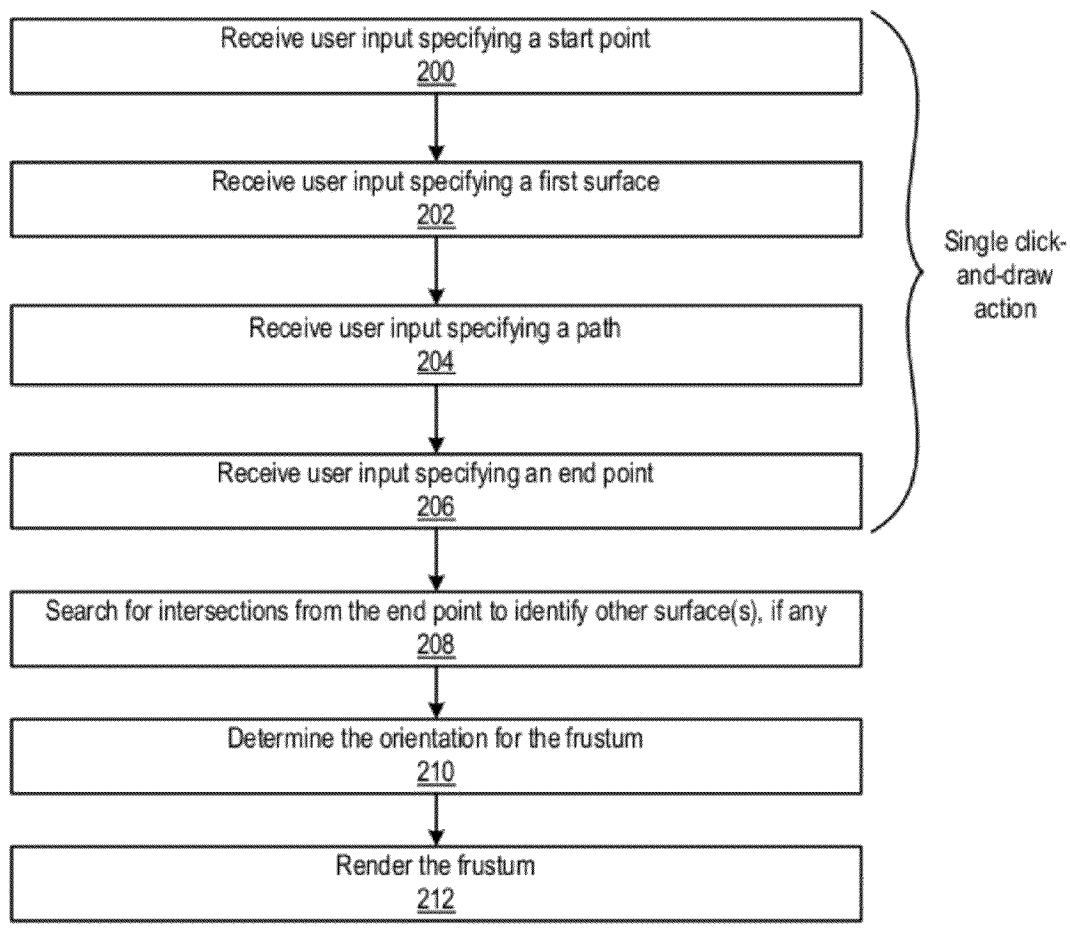
FIG. 10 is a flowchart of a method for modeling 3-D shapes, or frustums, using a single click-and draw action according to some embodiments.

FIG. 10 is a flowchart of a method for modeling 3-D shapes, or frustums, using a single click-and draw action according to some embodiments. As indicated at 200, a frustum modeling module may receive user input specifying a start point. For example, the user may move a cursor on a drawing screen to a desired position using a cursor control device, for example a mouse, and click and hold a button of the cursor control device. Other cursor control devices than a mouse may be used, such as a tablet and stylus, a touchpad, a touch screen, and so on. In general, any device or mechanism via which a cursor displayed on the screen can be controlled may be used. Furthermore, other user actions than clicking or depressing and holding a button may be used to initiate the action, such as touching a stylus to a tablet or a finger to a touchpad or touch screen. The point at which the user depresses the button or otherwise initiates the action may be stored as the starting position or point. As indicated at 202, the frustum modeling module may receive user input specifying a first, or start, surface. For example, the user may move the cursor on the drawing screen using the cursor control device while depressing the button of the cursor control device to inscribe or draw the outline of the start surface, intersecting the line to complete the surface. The start surface may be a square, rectangle, circle, other geometric shape, or an irregular shape. The point where the cursor intersects the drawn line, which may be but is not necessarily the start point, may be taken and stored as a first intersection.

As indicated at 204, the frustum modeling module may receive user input specifying a path extending from the intersection or from somewhere nearby on the drawn curve. For example, the user may move the cursor on the drawing screen using the cursor control device while continuing to depress the button of the cursor control device to draw the path. The path may be, but is not necessarily straight. The user may, but does not necessarily, draw one or more other surfaces on the path using the method described above for drawing the first surface. If the user draws one or more other surfaces, the last surface drawn will be the end surface. The user may, but does not necessarily, draw additional surfaces of the same shape and size as the start surfaces; intermediate surfaces, if any, and the end surface may be drawn in other shapes and/or sizes than the start surface.

As indicated at 206, the frustum modeling module may receive user input specifying an end point. For example, the user may release the button of the cursor control device upon the cursor reaching a desired end point on the drawing screen to specify an end point. The end point may be the last point on the path or on a portion of the path, or may be a point on the end surface, if one was drawn. If the path extends beyond the end surface, this last portion of the path may be referred to as the "tail", and may be used in determining the direction of orientation of the frustum model. In some embodiments, the tail may be used in determining other information such as color, position, and/or velocity Elements 200 through 206 are performed as a single user drag-and draw operation, as indicated in the Figure, using the frustum modeling tool, and the user input received therefrom specifies the surfaces and path, and possibly the orientation of, the frustum model. Note that, while the user is drawing the curve on the screen, the frustum modeling module may record at least some of the points on the line being drawn.

As indicated at 208, in some embodiments, after receiving the end point as indicated at 206, the frustum modeling module may search for intersections starting from the end point and going back along the drawn curve to identify other surface(s), if any. An enclosed area bounded by the line that meets at an identified intersection describes a surface. If no additional surfaces beyond the first surface are found, then the first surface may be duplicated at the end point for use as the end surface. If only one additional surface is found, then that surface is used as the end surface. If more than one additional surface is found, then the first identified additional surface, that is the one closest to the end point, is taken as the end surface, and the one or more other surfaces are taken as intermediate surfaces, which may be used in rendering the shape of the frustum model. The surfaces are not necessarily of the same shape and size; therefore, variations among the surfaces may be used in the rendering process to render complex or irregular frustums.

As indicated at 210, the frustum modeling module may determine the orientation for the frustum. Embodiments may provide different modes of orientation for defining the frustum. In parallel path orientation mode, the path drawn by the user (that is, the path between intersections or surfaces) is taken as on, or parallel to, the x-y plane, i.e. the plane of the screen. In some embodiments, using parallel path orientation, the start and end surfaces are rendered in the x-z plane. In oblique path orientation mode, the path is taken as not on or parallel to the x-y, or screen, plane, i.e. with a z component to the vector that defines the path. In some embodiments, using oblique path orientation, the start and end surfaces are rendered in the x-y plane. In some embodiments, a user interface to the frustum modeling module may provide user interface elements that allow the user to specify the desired orientation mode prior to drawing the curve. Note that, if the user drew a "tail" extending beyond the end surface, the tail may be used by the frustum modeling module to determine the direction to orient the frustum module. In some embodiments, the tail may be used to determine other information such as color, position, and/or velocity.

As indicated at 212, the frustum modeling module may then render the frustum model from the user input and orientation information. In embodiments, this may include, but it's not limited to, fitting a frustum outer surface or "skin" to the two or more surfaces (including a start surface, end surface, and zero or more intermediate surfaces). See, for example, FIG. 9B. Any of a variety of surface rendering techniques may be used in embodiments to generate the "skin" for the frustum model. The frustum modeling module may add color, shading, lighting, texture, or other elements to the skin according to current settings or user preference. After rendering the frustum model, the model may be displayed to the screen. The model may replace the user-drawn curve on the screen. The rendered model may then be modified, manipulated, stored, printed, and so on according to the capabilities of the 3-D modeling application and the desires of the user.

FIG. 11 illustrates an example embodiment of a frustum modeling module that may implement the above-described method. FIG. 11 is given as an example, and is not intended to be limiting. Some embodiments of the frustum modeling module 302 may be implemented, for example as a stand-alone program or utility, as a library function, or as a module in an application. Some embodiments of the frustum modeling module 302 may be otherwise implemented, for example as a plug-in for 3-D modeling applications or other applications. An example application in which embodiments may be implemented is Adobe® Director®. Embodiments of the frustum modeling module 302 may be implemented or used in a 3-D modeling application 300, as illustrated in FIG. 11, to generate frustums or other geometric shapes using a single click-and-draw action. In such applications, embodiments of the frustum modeling method described herein, implemented by the frustum modeling module, may be provided as a frustum modeling tool that may be selected or activated via a user interface, for example as a tool selection on a tool menu or tool palette.

In operation, frustum modeling module 302 obtains one or more settings and a single click-and-draw user action as input. Frustum modeling module 302 then processes the single click-and-draw user action according to the current settings to render a 3-D frustum model 320 as output.

Embodiments of the frustum modeling module 302 may provide a user interface that provides one or more textual and/or graphical user interface elements, modes or techniques via which a user may specify settings, perform single click-and-draw user actions. The user interface may also provide one or more textual and/or graphical user interface elements, modes or techniques via which a user may perform other operations which may include, but are not limited to, one or more of specifying output files, saving rendered models, printing, further manipulating or modifying rendered models, and so on, and in general provide input to and/or control various aspects of frustum modeling using embodiments of the frustum modeling tool as described herein. In some embodiments, frustum modeling module 302 may provide real-time or near-real-time feedback to the user via dynamic display on a display device(s) of results of frustum modeling actions made according to the user input via the user interface. Results 320 (e.g., a rendered model) of the frustum modeling performed according to the frustum modeling method and apparatus described herein may be provided. For example, results 320 may be displayed on a display device, printed, and/or written to or stored on any of various types of memory media, such as storage media or storage devices. Alternatively, or in addition, results 320 may be provided to another local or remote program, application, or module for further processing.

Figure 12:
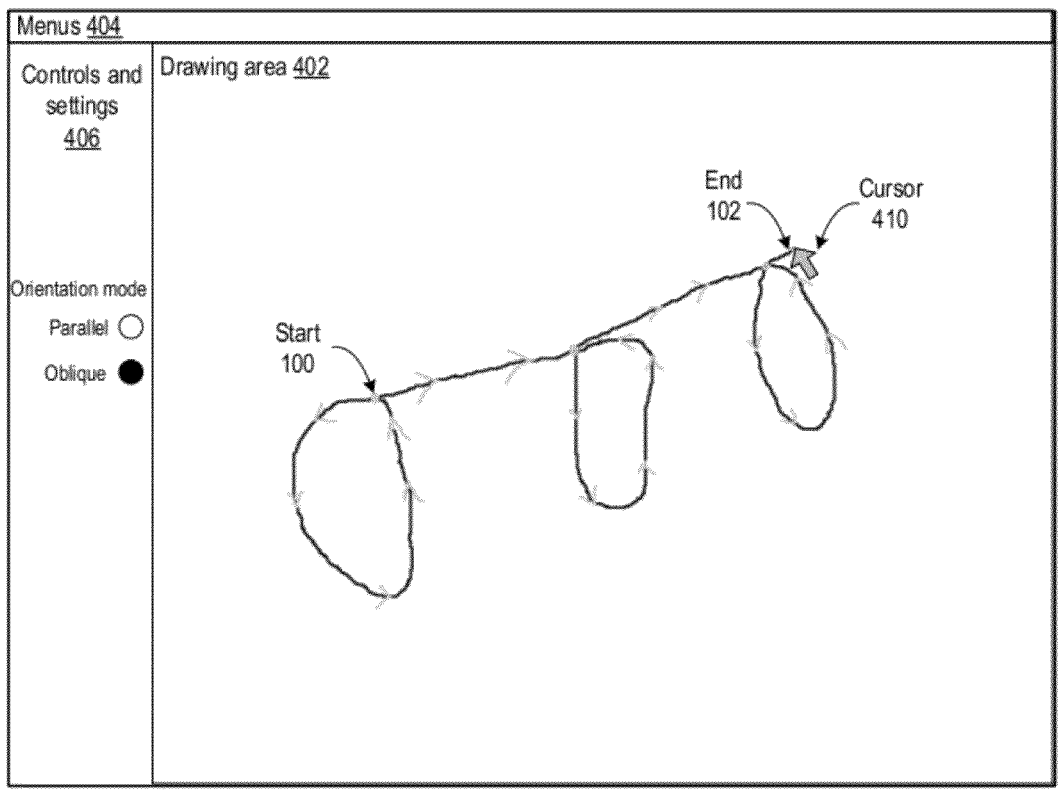
FIG. 12 illustrates an example frustum modeling module user interface according to some embodiments.

FIG. 12 illustrates an example frustum modeling module user interface according to some embodiments. FIG. 12 is given as an example, and is not intended to be limiting. The example frustum modeling module user interface 400 may include a drawing area 402 in which the user may apply the frustum modeling tool, menus 404 and controls and settings 406. Menus 404 may include one or more menus via which the user may navigate to or select other functionalities of the application implementing the frustum modeling tool. Controls and settings 406 may include one or more user interface elements via which the user may select or modify aspects of the frustum modeling tool and/or of the frustum rendering technique applied by the frustum modeling module. In this example, user interface elements (radio buttons) that allow the user to select among orientation modes are provided. The "Oblique" orientation mode is shown as selected, as indicated by the radio button corresponding to "Oblique" being black. Other user interface elements than radio buttons may be used to select, for example check boxes and pop-up menus. In some embodiments, instead of, or in addition to, the settings for the frustum modeling module being provided via user interface elements as shown in FIG. 12, other methods may be used to provide the settings to the user. For example, in one embodiment, the cursor control device may include a button (e.g., a right button on a conventional mouse) that the user may depress to display one or more user-selectable settings. As another example, a menu in menus 404 may include a frustum modeling tool menu selection that the user may select to display a window for configuring the frustum modeling module.

Drawing area 402 shows an example curve that may be drawn by a user using the frustum modeling tool using a single click-and-draw action, for example as described above in relation to FIG. 9A and FIG. 10, elements 200 through 206. The cursor 410 is shown at the end point 102 of the drawing, where the user releases the cursor control device button to complete the curve.

While FIG. 12 shows the user input to a blank screen, it is to be noted that embodiments of the frustum rendering tool may be used to generate frustum models onto existing images as additional elements.

Example System

Figure 13:
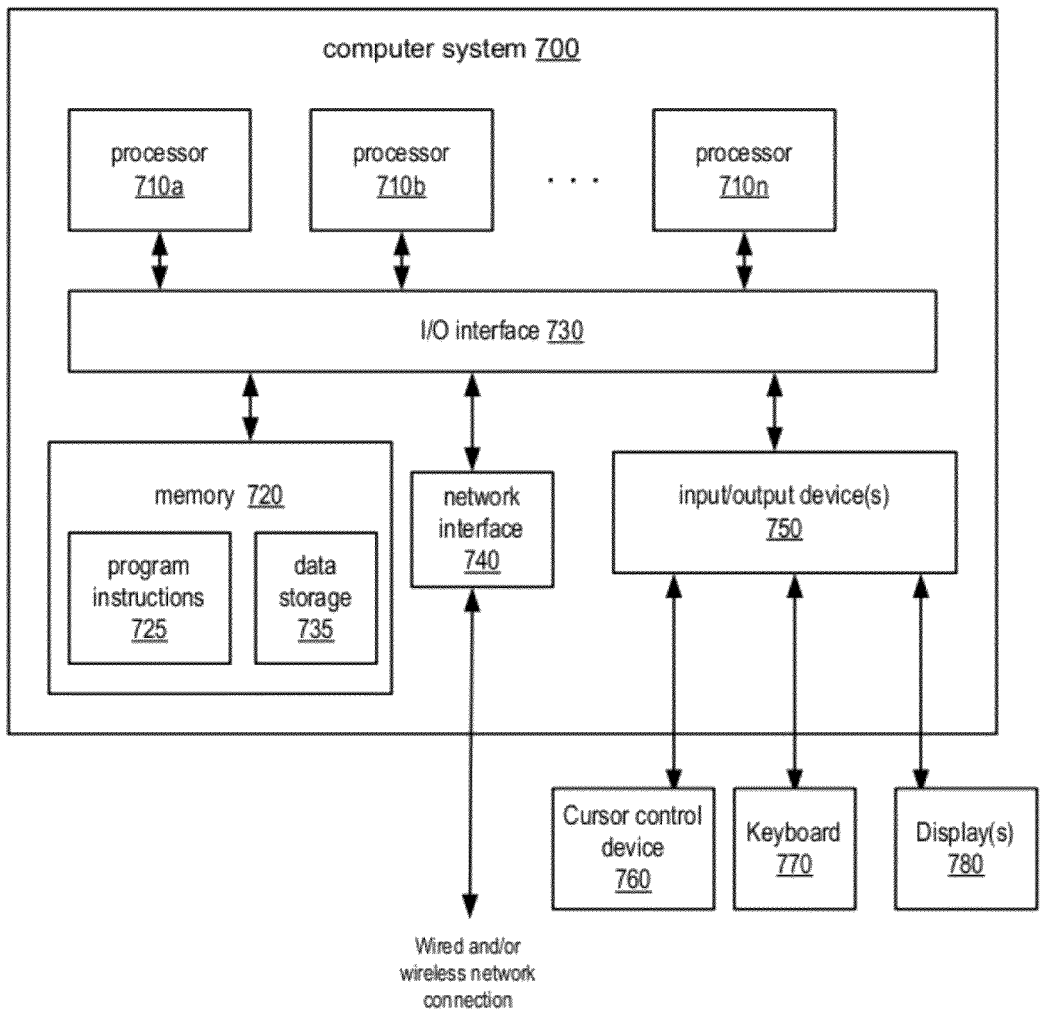
FIG. 13 illustrates an example computer system that may be used in embodiments.

Various components of embodiments of a frustum modeling module may be executed on one or more computer systems, which may interact with various other devices. One such computer system is illustrated by FIG. 13. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. Cursor control device may be a mouse, a tablet and stylus, a touchpad, a touch screen, or in general any device or mechanism via which a cursor displayed on a screen or other display device may be controlled. In some embodiments, it is contemplated that embodiments may be implemented using a single instance of computer system 700, while in other embodiments multiple such systems, or multiple nodes making up computer system 700, may be configured to host different portions or instances of embodiments. For example, in some embodiments, some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, at least one processor 710 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for frustum modeling and rendering may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a frustum modeling module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In some embodiments, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 13, memory 720 may include program instructions 725, configured to implement embodiments of a frustum modeling module as described herein, and data storage 735, comprising various data accessible by program instructions 725. In some embodiments, program instructions 725 may include software elements of a frustum modeling module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a frustum modeling module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
receiving user input to a computer device drawing a curve via a single continuous user input action, wherein the curve includes an enclosed portion defining a start surface for a frustum to be rendered and a line extending from the enclosed portion, wherein the line defines a path of the frustum, wherein the path of the frustum is the path followed by the center of a section of the frustum taken parallel to its start surface and end surface;
determining an end surface for the frustum based on at least a portion of the curve;
rendering a 3-dimensional model of the frustum according to the start surface, the end surface, and the path; and
displaying the 3-dimensional model of the frustum on a display screen for the computer device.

2. The computer-implemented method as recited in claim 1, wherein the single action comprises depressing a button of a cursor control device at a start point for the curve, moving a cursor on the display screen via movement of the cursor control device to draw the curve including at least the start surface and the path, and releasing the button at an end point of the curve.

3. The computer-implemented method as recited in claim 1, wherein the single action comprises activating a cursor control device at a start point for the curve, moving a cursor on the display screen via interaction with the cursor control device to draw the curve including at least the start surface and the path, and deactivating the cursor control device at an end point of the curve.

4. The computer-implemented method as recited in claim 1, wherein said determining an end surface for the frustum comprises:
determining if there is an intersection point at which the curve intersects itself that is not on the enclosed portion defining the start surface;
if there is an intersection point, taking an enclosed portion of the curve indicated by the intersection point as the end surface of the frustum;
if there is not an intersection point, copying the start surface to the end of the curve as the end surface of the frustum.

5. The computer-implemented method as recited in claim 1, further comprising determining one or more intermediate surfaces for the frustum, wherein the intermediate surfaces are between the start surface and the end surface, and wherein, in said rendering a 3-dimensional model of the frustum, the method further comprises rendering at least a portion of the 3-dimensional model according to the one or more intermediate surfaces.

6. The computer-implemented method as recited in claim 1, wherein a portion of the path extends beyond the end surface, and wherein, in said rendering a 3-dimensional model of the frustum, the method further includes determining an orientation for the 3-dimensional model from the portion of the path extending beyond the end surface.

7. The computer-implemented method as recited in claim 1, wherein, in said rendering a 3-dimensional model of the frustum, the method further includes:
determining an orientation mode for rendering the 3-dimensional model, wherein the orientation mode is one of parallel orientation mode and oblique orientation mode wherein, in parallel orientation mode, the 3-D model is rendered with the path of the frustum on a vector parallel to a plane of the display screen, and wherein, in oblique orientation mode, the 3-D model is rendered with the path of the frustum on a vector that intersects but is not parallel to the plane of the display screen; and
rendering the 3-D model according to the determined orientation mode.

8. The computer-implemented method as recited in claim 7, further comprising receiving user input specifying the orientation mode prior to receiving the user input specifying the curve.

9. A system, comprising:
at least one processor;
a display device;
a cursor control device; and
a memory comprising program instructions, wherein the program instructions are executable by the at least one processor to:
receive user input via the cursor control device drawing a curve via a single continuous user input action, wherein the curve includes an enclosed portion defining a start surface for a frustum to be rendered and a line extending from the enclosed portion, wherein the line defines a path of the frustum, wherein the path of the frustum is the path followed by the center of a section of the frustum taken parallel to its start surface and end surface;
determine an end surface for the frustum based on at least a portion of the curve;
render a 3-dimensional model of the frustum according to the start surface, the end surface, and the path; and
display the 3-dimensional model of the frustum to the display device.

10. The system as recited in claim 9, wherein the single action comprises depressing a button of a cursor control device at a start point for the curve, moving a cursor on the display device via movement of the cursor control device to draw the curve including at least the start surface and the path, and releasing the button at an end point of the curve.

11. The system as recited in claim 9, wherein the single action comprises activating a cursor control device at a start point for the curve, moving a cursor on the display screen via interaction with the cursor control device to draw the curve including at least the start surface and the path, and deactivating the cursor control device at an end point of the curve.

12. The system as recited in claim 9, wherein to determine an end surface for the frustum, the program instructions are executable by the at least one processor to:
   determine if there is an intersection point at which the curve intersects itself that is not on the enclosed portion defining the start surface;
   if there is an intersection point, take an enclosed portion of the curve indicated by the intersection point as the end surface of the frustum;
   if there is not an intersection point, copy the start surface to the end of the curve as the end surface of the frustum.

13. The system as recited in claim 9, wherein the program instructions are executable by the at least one processor to determine one or more intermediate surfaces for the frustum, wherein the intermediate surfaces are between the start surface and the end surface, and wherein, in to render a 3-dimensional model of the frustum, the program instructions are executable by the at least one processor to render at least a portion of the 3-dimensional model according to the one or more intermediate surfaces.

14. The system as recited in claim 9, wherein a portion of the path extends beyond the end surface, and wherein, to render a 3-dimensional model of the frustum, the program instructions are executable by the at least one processor to determine an orientation for the 3-dimensional model from the portion of the path extending beyond the end surface.

15. The system as recited in claim 9, wherein, to render a 3-dimensional model of the frustum, the program instructions are executable by the at least one processor to:
   determine an orientation mode for rendering the 3-dimensional model, wherein the orientation mode is one of parallel orientation mode and oblique orientation mode wherein, in parallel orientation mode, the 3-D model is rendered with the path of the frustum on a vector parallel to a plane of the display device screen, and wherein, in oblique orientation mode, the 3-D model is rendered with the path of the frustum on a vector that intersects but is not parallel to the plane of the display device screen; and
   render the 3-D model according to the determined orientation mode.

16. The system as recited in claim 15, wherein the program instructions are executable by the at least one processor to receive user input specifying the orientation mode prior to receiving the user input specifying the curve.

17. A non-transitory computer-readable storage medium storing program instructions, wherein the program instructions are computer-executable to implement:
   receiving user input to a computer device drawing a curve via a single continuous user input action, wherein the curve includes an enclosed portion defining a start surface for a frustum to be rendered and a line extending from the enclosed portion, wherein the line defines a path of the frustum, wherein the path of the frustum is the path followed by the center of a section of the frustum taken parallel to its start surface and end surface;
   determining an end surface for the frustum based on at least a portion of the curve;
   rendering a 3-dimensional model of the frustum according to the start surface, the end surface, and the path; and
   displaying the 3-dimensional model of the frustum on a display screen for the computer device.

18. The non-transitory computer-readable storage medium as recited in claim 17, wherein the single action comprises depressing a button of a cursor control device at a start point for the curve, moving a cursor on the display screen via movement of the cursor control device to draw the curve including at least the start surface and the path, and releasing the button at an end point of the curve.

19. The non-transitory computer-readable storage medium as recited in claim 17, wherein the single action comprises activating a cursor control device at a start point for the curve, moving a cursor on the display screen via interaction with the cursor control device to draw the curve including at least the start surface and the path, and deactivating the cursor control device at an end point of the curve.

20. The non-transitory computer-readable storage medium as recited in claim 17, wherein, in said determining an end surface for the frustum, wherein the program instructions are computer-executable to implement:
   determining if there is an intersection point at which the curve intersects itself that is not on the enclosed portion defining the start surface;
   if there is an intersection point, taking an enclosed portion of the curve indicated by the intersection point as the end surface of the frustum;
   if there is not an intersection point, copying the start surface to the end of the curve as the end surface of the frustum.

21. The non-transitory computer-readable storage medium as recited in claim 17, wherein the program instructions are computer-executable to implement determining one or more intermediate surfaces for the frustum, wherein the intermediate surfaces are between the start surface and the end surface, and wherein, in said rendering a 3-dimensional model of the frustum, the program instructions are computer-executable to implement rendering at least a portion of the 3-dimensional model according to the one or more intermediate surfaces.

22. The non-transitory computer-readable storage medium as recited in claim 17, wherein a portion of the path extends beyond the end surface, and wherein, in said rendering a 3-dimensional model of the frustum, the program instructions are computer-executable to implement determining an orientation for the 3-dimensional model from the portion of the path extending beyond the end surface.

23. The non-transitory computer-readable storage medium as recited in claim 17, wherein, in said rendering a 3-dimensional model of the frustum, the program instructions are computer-executable to implement:
   determining an orientation mode for rendering the 3-dimensional model, wherein the orientation mode is one of parallel orientation mode and oblique orientation mode wherein, in parallel orientation mode, the 3-D model is rendered with the path of the frustum on a vector parallel to a plane of the display screen, and wherein, in oblique orientation mode, the 3-D model is rendered with the path of the frustum on a vector that intersects but is not parallel to the plane of the display screen; and
   rendering the 3-D model according to the determined orientation mode.

24. The non-transitory computer-readable storage medium as recited in claim 23, wherein the program instructions are computer-executable to implement receiving user input specifying the orientation mode prior to receiving the user input specifying the curve.

25. A computer-implemented method, comprising:
- executing instructions on a computing device so that binary digital electronic signals representing a curve drawn via a single continuous user input action are received as user input, wherein the curve includes an enclosed portion defining a start surface for a frustum to be rendered and a line extending from the enclosed portion, wherein the line defines a path of the frustum, wherein a path of a frustum is the path followed by the center of a section of the frustum taken parallel to its start surface and end surface, and wherein the curve is specified via a single user action via a cursor control device;
- executing instructions on said computing device so that binary digital electronic signals representing an surface for the frustum are determined from at least a portion of the received curve;
- executing instructions on said computing device so that binary digital electronic signals representing a 3-dimensional model of the frustum are rendered according to the start surface, the end surface, and the path; and
- storing the 3-dimensional model of the frustum in a memory location of said computing device for later use.

\* \* \* \* \*

UNITED STATES PATENT AND TRADEMARK OFFICE
CERTIFICATE OF CORRECTION

PATENT NO. : 8,334,869 B1
APPLICATION NO. : 12/409284
DATED : December 18, 2012
INVENTOR(S) : Avinash Kumar Rao Padmakar et al.

Page 1 of 1

It is certified that error appears in the above-identified patent and that said Letters Patent is hereby corrected as shown below:

In the Claims

In column 20, line 2, replace "an surface" with --an end surface--.

Signed and Sealed this
Fourteenth Day of May, 2013

Teresa Stanek Rea
*Acting Director of the United States Patent and Trademark Office*